Reissued Nov. 1, 1932

Re. 18,643

UNITED STATES PATENT OFFICE

WILHELM ECKERT AND HEINRICH GREÜNE, OF FRANKFORT-ON-THE-MAIN-HOCHST, GERMANY, ASSIGNOR TO GENERAL ANILINE WORKS, INC., A CORPORATION OF DELAWARE

VAT DYESTUFF AND PROCESS OF MAKING SAME

No Drawing. Original No. 1,588,451, dated June 15, 1926, Serial No. 44,369, filed July 17, 1925, and in Germany July 21, 1924. Application for reissue filed April 8, 1930. Serial No. 442,678.

We have found that new valuable mixtures of vat dyestuffs are obtainable by condensing the dianhydride of 1.4.5.8-naphthalenetetra-carboxylic acid, or this acid itself or its substitution products, with an ortho-diamine or a salt of it. The new dyestuff mixtures are distinguished by the beautiful shades they give, and their excellent properties as to fastness.

It could not be expected that mixtures of vat-dyestuffs are obtainable by means of naphthalenetetra-carboxylic acid, because 1.4.5.8-napthalenetetra-carboxylic acid used as parent product is a perfectly white body to which, even if it is transformed into the di-imide, cannot be imparted the characteristic properties of a dyestuff.

The following example illustrates our invention, the parts being by weight:

10 parts of the dianhydride of 1.4.5.8-naphthalenetetra-carboxylic acid are heated in 50 parts of nitrobenezene with 20 parts of ortho-phenylenediamine until the product resulting from the reaction is entirely separated. This product is filtered off by suction and washed with alcohol until the excess of ortho-phenylenediamine is entirely eliminated. The new product forms, when dry, a bright red powder which dissolves in concentrated sulfuric acid to a yellowish-brown solution. It gives a green vat which dyes cotton the same color which, when the material is exposed to the air, changes to a brilliant red tint with a yellow hue.

If for the ortho-phenylenediamine is substituted 4-chloro-1.2-diaminobenzene and the further operations are carried out as above indicated, a product is obtainable which dyes cotton from a green vat a green tint which, when the material is exposed to the air, changes to a bright reddish brown shade of excellent fastness.

From 4-nitro-1.2-diaminobenzene and 1.4.-5.8.-naphthalenetetra-carboxylic acid or its anhydride a product is obtainable as a brown powder, which dissolves in concentrated sulfuric acid to a yellow solution with an intense green fluorescence. The vat prepared therefrom is of a green color and dyes cotton the same color which, when the material is exposed to the air, changes to a grey to black tint.

In the same manner there may be condensed instead of the bases themselves their salts, particularly the hydrochlorides, with naphthalene-1.4.5.8-tetra-carboxylic acid or its anhydride.

Instead of condensing a naphthalene-1.4.5.8-tetra-carboxylic acid halogenated or not, with a halogenated ortho-phenylenediamine substituted or not, the finally formed condensation products partially containing or not containing halogen, may afterwards be halogenated. The halogenation may be effected by suspending the condensation product in a diluent, such as nitrobenzene, and introducing for instance a gentle current of chlorine into the mass while heating to about 160–180° C. Finally the mass is isolated in the usual manner.

The chlorinated product thus obtained dissolves in concentrated sulfuric acid with a red color and dyes cotton from a green vat a reddish-brown tint.

As 1.4.5.8-naphthalenetetra-carboxylic acid reacts in essentially the same manner as the anhydride, we understand by the term "1.4.5.8 - naphthalenetetra - carboxylic acid", used in the following claims, not only this acid itself but also its anhydride, and by an "ortho-diamine" we understand also the salts of it.

The condensation may also be effected in absence of a solvent or diluent with the same result by melting together for a short time both components.

Our experiments have shown that the products obtainable by the above described process are not products of uniform chemical composition but represent in many cases mixtures of isomeric compounds formed by the reaction. When condensing for instance the dianhydride - 1.4.5.8 - naphthalenetetra-carboxylic acid with ortho-phenylenediamine a product is obtained which represents a mixture of the two isomeric dyestuffs of the following formulæ:

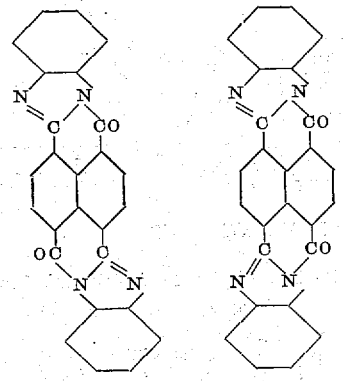

When using instead of ortho-phenylenediamine a substitution product thereof in most cases likewise a mixture of two isomeric compounds is obtained, although generally when using a substituted ortho-diphenylene compound the formation of the one or of the other of the two isomeric compounds preponderates according to the directing influence of the substituent.

We claim:

1. The process which comprises condensing a 1.4.5.8-napthalenetetra-carboxylic acid with an ortho-diamine.

2. The process which comprises condensing a 1.4.5.8-napthalenetetra-carboxylic acid with an ortho-diamine in presence of a diluent.

3. Process of preparing vat dyestuffs, consisting in condensing 1.4.5.8-naphthalenetetracarboxylic acid with a nitrated 1.2-diaminobenzene.

4. Process of preparing vat dyestuffs, consisting in condensing a 1.4.5.8-napthalenetetracarboxylic acid with an ortho-diamine and halogenating the condensation product.

5. The products which are obtainable by condensing a 1.4.5.8-napthalenetetra-carboxylic acid with an ortho-diamine the said products representing a mixture of the two isomeric dyestuffs of the following compositions:

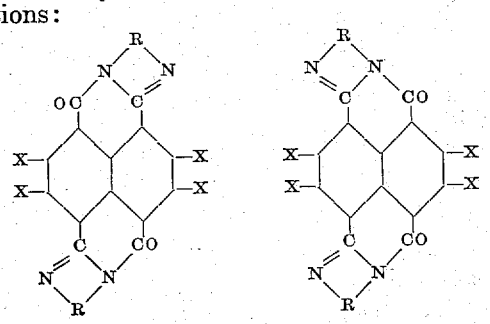

wherein X represents hydrogen or any substituent and R stands for hydrocarbon substituted or not.

6. The products which are obtainable by condensing a 1.4.5.8-napthalenetetra-carboxylic acid with an ortho-diamino compound of the benzene series the said products representing a mixture of the two isomeric dyestuffs of the following formulæ:

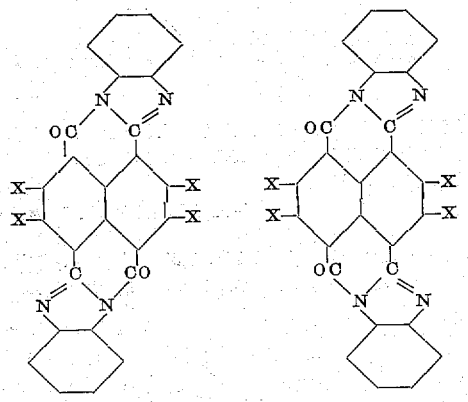

wherein X represents hydrogen or a substituent and wherein the benzene nuclei may be substituted.

7. The product which is obtainable by condensing 1.4.5.8 - napthalenetetra - carboxylic acid with ortho-phenylenediamine the said compound being a red powder, soluble in concentrated sulfuric acid with a yellowish-brown color, giving a green vat, from which cotton is dyed after exposure to the air a brilliant yellowish-red.

WILHELM ECKERT.
HEINRICH GREÜNE.